US011743039B2

(12) United States Patent
Pe'Er et al.

(10) Patent No.: US 11,743,039 B2
(45) Date of Patent: Aug. 29, 2023

(54) SYSTEM AND METHOD FOR DATA ENCRYPTION USING KEY DERIVATION

(71) Applicant: Coinbase IL RD Ltd., Oakland, CA (US)

(72) Inventors: Guy Pe'Er, Talmey Yechiel (IL); Nir Steinherz, Modiin-Maccabim-Reut (IL)

(73) Assignee: Coinbase IL RD Ltd., Oakland, CA (US)

(*) Notice: Subject to any disclaimer, the term of this patent is extended or adjusted under 35 U.S.C. 154(b) by 0 days.

(21) Appl. No.: 17/234,829

(22) Filed: Apr. 20, 2021

(65) Prior Publication Data

US 2022/0337409 A1    Oct. 20, 2022

(51) Int. Cl.
*H04L 9/08* (2006.01)
*H04L 9/06* (2006.01)

(52) U.S. Cl.
CPC ............. *H04L 9/0877* (2013.01); *H04L 9/06* (2013.01); *H04L 9/083* (2013.01); *H04L 9/0894* (2013.01); *H04L 2209/24* (2013.01); *H04L 2209/46* (2013.01)

(58) Field of Classification Search
CPC ..... H04L 9/0877; H04L 9/0894; H04L 9/083; H04L 2209/46
USPC .................................................... 380/280
See application file for complete search history.

(56) References Cited

U.S. PATENT DOCUMENTS

| 8,619,993 | B2* | 12/2013 | Verma ............... | H04W 12/0431 380/278 |
| 9,769,654 | B2* | 9/2017 | Bettale ............. | H04N 21/41407 |
| 10,162,568 | B2* | 12/2018 | Ji ........................... | G06F 3/0611 |
| 10,742,421 | B1* | 8/2020 | Wentz ................ | H04L 9/3278 |
| 11,121,869 | B1* | 9/2021 | Crahen ................. | G06F 9/547 |
| 2002/0196935 | A1* | 12/2002 | Wenocur ............... | H04L 67/306 380/37 |
| 2003/0009694 | A1* | 1/2003 | Wenocur ................. | H04L 63/04 726/4 |
| 2003/0120605 | A1* | 6/2003 | Fontana .................. | G06F 21/10 705/59 |
| 2004/0042620 | A1* | 3/2004 | Andrews ............... | H04L 9/0894 380/286 |
| 2004/0088558 | A1* | 5/2004 | Candelore .......... | H04N 21/4623 713/193 |
| 2005/0094805 | A1* | 5/2005 | Kitani ................... | H04L 9/0662 380/28 |
| 2005/0180572 | A1* | 8/2005 | Graunke ............... | H04L 9/0891 380/277 |
| 2008/0130895 | A1* | 6/2008 | Jueneman ............. | H04L 9/3252 380/277 |

(Continued)

*Primary Examiner* — Saleh Najjar
*Assistant Examiner* — Peiliang Pan
(74) *Attorney, Agent, or Firm* — Perkins Coie LLP

(57) ABSTRACT

A computerized system and method for symmetric encryption and decryption using two machines, the method including obtaining a message and an initialization vector on a first machine, sending the initialization vector to a second machine, where said second machine stores an encryption key for a Key Derivation Function (KDF), generating a derived key on the second machine by applying the KDF receiving as input both the encryption key and the initialization vector, sending the derived key from the second machine to the first machine, and encrypting the message using the derived key on the first machine.

17 Claims, 3 Drawing Sheets

(56) References Cited

U.S. PATENT DOCUMENTS

| | | | | |
|---|---|---|---|---|
| 2008/0313462 A1* | 12/2008 | Zhao | H04L 9/0844 | |
| | | | 713/170 | |
| 2010/0067704 A1* | 3/2010 | Hauge | H04L 9/0662 | |
| | | | 380/284 | |
| 2010/0135486 A1* | 6/2010 | Schneider | H04L 9/0637 | |
| | | | 380/46 | |
| 2011/0004757 A1* | 1/2011 | Horn | H04L 63/062 | |
| | | | 713/168 | |
| 2013/0073850 A1* | 3/2013 | Zaverucha | H04L 9/0869 | |
| | | | 713/168 | |
| 2014/0108793 A1* | 4/2014 | Barton | H04W 12/06 | |
| | | | 713/165 | |
| 2015/0180654 A1* | 6/2015 | Falk | H04L 9/14 | |
| | | | 380/44 | |
| 2017/0206174 A1* | 7/2017 | Keranen | H04L 9/0643 | |
| 2017/0228547 A1* | 8/2017 | Smith | H04L 9/0819 | |
| 2018/0018274 A1* | 1/2018 | Bradbury | G06F 12/1009 | |
| 2018/0018290 A1* | 1/2018 | Zuckerman | G06F 3/061 | |
| 2018/0054316 A1* | 2/2018 | Tomlinson | H04L 63/061 | |
| 2018/0069699 A1* | 3/2018 | Bowman | H04L 9/002 | |
| 2019/0087594 A1* | 3/2019 | Nix | H04W 12/35 | |
| 2019/0147170 A1* | 5/2019 | Keselman | H04L 9/0869 | |
| | | | 713/189 | |
| 2019/0149320 A1* | 5/2019 | Keselman | H04L 9/0861 | |
| | | | 380/279 | |
| 2019/0288853 A1* | 9/2019 | Gray | H04L 9/3239 | |
| 2019/0370189 A1* | 12/2019 | Wang | G06F 12/1408 | |
| 2019/0371106 A1* | 12/2019 | Kaye | G07C 13/00 | |
| 2020/0013043 A1* | 1/2020 | Smets | G06Q 20/40145 | |
| 2020/0073952 A1* | 3/2020 | Kardonik | G06F 16/24552 | |
| 2020/0336470 A1* | 10/2020 | Kravitz | G06F 21/577 | |
| 2020/0344063 A1* | 10/2020 | Zhang | H04L 63/0869 | |
| 2020/0380149 A1* | 12/2020 | Ramesh | H04L 9/0866 | |
| 2021/0119780 A1* | 4/2021 | Hassan | H04L 9/0637 | |
| 2021/0184842 A1* | 6/2021 | Nix | H04L 9/0825 | |
| 2021/0218562 A1* | 7/2021 | Grobelny | G06F 21/54 | |
| 2021/0266175 A1* | 8/2021 | Bernsen | H04L 9/0643 | |
| 2021/0377007 A1* | 12/2021 | Schiffman | H04L 9/0822 | |
| 2022/0060455 A1* | 2/2022 | Rosenstein | G06F 21/64 | |
| 2022/0092208 A1* | 3/2022 | Jacobs | G06F 21/6227 | |
| 2022/0141004 A1* | 5/2022 | Murray | H04L 9/0825 | |
| | | | 713/171 | |

\* cited by examiner

SYSTEM AND METHOD FOR DATA ENCRYPTION USING KEY DERIVATION

FIELD

The present disclosure generally relates to data encryption and decryption using key derivation.

BACKGROUND

The main challenge of symmetric encryption is where to store the encryption key and how to prevent it from being stolen.

In many cases, the encryption key is stored and used remotely, in a physical HSM (hardware security module) or in a virtual HSM (based on software). Security is achieved by making it very hard for an attacker to breach the HSM/vHSM itself, and by never exporting the key outside of the HSM/vHSM. Since the key is never exported from the HSM/vHSM, the data to be encrypted (or the ciphertext to be decrypted) must be sent remotely in order to carry out the operation.

This has two significant drawbacks:
1. Encrypting large data items requires much longer time compared to local computation
2. Sending plaintext data remotely introduces additional security risks that are better avoided. These are greatly mitigated by using TLS, but it is nevertheless better to keep the plaintext local so that it is not exposed to additional avenues of attack.

The classic cryptographic solution to this problem is to use envelope encryption (KEK/DEK Paradigm), that uses encrypts a message using a data-encryption-key (DEK) specific to that message, while the DEK itself is encrypted with a long-term key-encryption-key (KEK). Thus, an encryption of a message m with the key-encryption-key K, works as follows:
1. Choose a random symmetric data-encryption-key for this message m; denote it Km
2. Encrypt message m using the data-encryption-key Km; denote the result Cm
3. Encrypt the key Km using the key-encryption-key K; denote the result Ck
4. Output (Ck, Cm) In mathematical notation, we have:

$$Ck \leftarrow Enc(K;Km), Cm \leftarrow Enc(Km;m).$$

(Note that each of these ciphertexts include an IV, as required by secure encryption modes.) In order to decrypt, first decrypt Ck to get Km using the key-encryption-key K, and then decrypt Cm to get m using the data-encryption-key Km.

Envelope encryption is a good solution in the sense that the potentially long message m (and ciphertext) does not have to be sent remotely, improving performance, and the plaintext is not revealed on any other machine, improving security.

However, envelope encryption requires increasing the size of the ciphertext. Instead of storing only Cm, one needs to also store Ck. In most cases, this increased size in the ciphertext is not consequential. However, it can certainly make a difference for existing applications that are used to only storing Cm and are sensitive to the size of the ciphertext.

SUMMARY

In one aspect the subject matter discloses a system including a computerized device, including a processing system of the computerized device including one or more processors, and a memory system including one or more computer-readable media, where the one or more computer-readable media contain instructions that, when executed by the processing system, cause the processing system to perform operations including obtaining a message and an initialization vector on a first machine, sending the initialization vector to a second machine, where said second machine stores an encryption key for a Key Derivation Function (KDF), generating a derived key on the second machine by applying the KDF receiving as input both the encryption key and the initialization vector, sending the derived key from the second machine to the first machine, encrypting the message using the derived key on the first machine.

In some cases, the first machine and the second machine are installed on a single electronic device. In some cases, the first machine and the second machine are installed on two separate electronic devices. In some cases, the first machine lacks access to the encryption key for the KDF.

In some cases, the second machine generates the derived key by performing a multi-party computation (MPC) process with another machine. In some cases, the second machine is a hardware security module. In some cases, the second machine is a cloud key management system.

The encryption key used for the key derivation is secret. If an attacker steals the encryption key, the attacker can decrypt everything since given the IV and the encryption key for the KDF, it is possible to derive the derived key and decrypt the message. As such, it is necessary to prevent the encryption key from being stolen. In some cases, the encryption key is protected from being stolen using MPC with the encryption key shared between two or more machines. The fact that it is split between multiple machines makes it hard to steal. In other cases, a hardware security module or a cloud key management system may be used.

In some cases, the instructions also include a first machine obtaining an encrypted message and an initialization vector, the second machine computing a derived key using a key derivation function receiving as input the encryption key and the initialization vector, the second machine sending the derived key to the first machine, the first machine decrypting the encrypted message using the derived key and initialization vector.

In another aspect of the subject matter a method is provided performed by a computerized device that includes a processing system having one or more processors and a memory system including one or more computer-readable media, where the one or more computer-readable media contain instructions that, when executed by the processing system, cause the processing system to perform the method including obtaining a message and an initialization vector on a first machine, sending the initialization vector to a second machine, where said second machine stores an encryption key for a Key Derivation Function (KDF), generating a derived key on the second machine by applying the KDF receiving as input both the encryption key and the initialization vector, sending the derived key from the second machine to the first machine, encrypting the message using the derived key on the first machine.

BRIEF DESCRIPTION OF THE DRAWINGS

The invention may be more clearly understood upon reading of the following detailed description of non-limiting exemplary embodiments thereof, with reference to the following drawings, in which.

Figure 1:
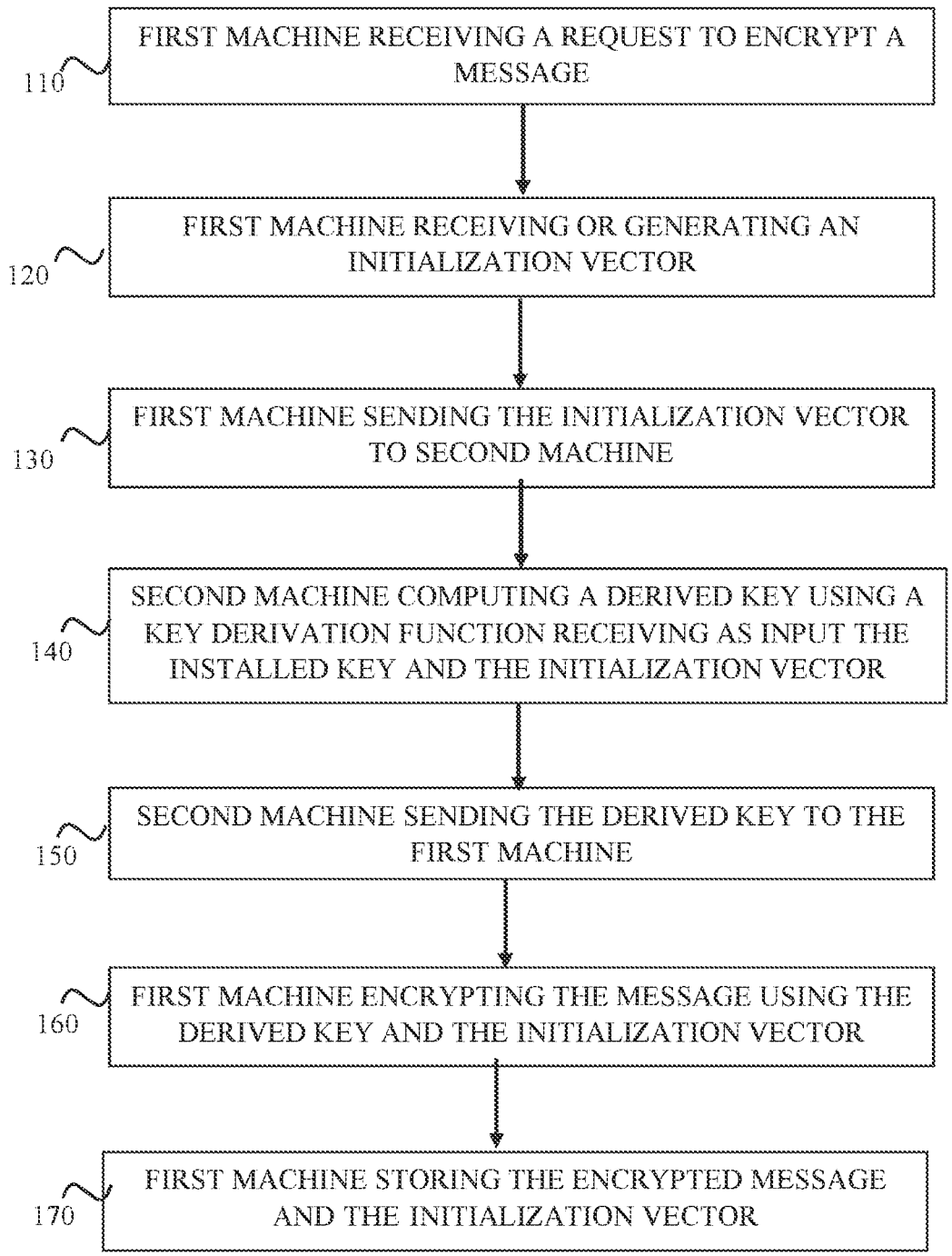
FIG. 1 discloses method for encrypting a message using a key derivation function, according to exemplary embodiments of the subject matter.

The following detailed description of embodiments of the invention refers to the accompanying drawings referred to above. Dimensions of components and features shown in the figures are chosen for convenience or clarity of presentation and are not necessarily shown to scale. Wherever possible, the same reference numbers will be used throughout the drawings and the following description to refer to the same and like parts.

DETAILED DESCRIPTION

Illustrative embodiments of the invention are described below. In the interest of clarity, not all features/components of an actual implementation are necessarily described.

The invention, in embodiments thereof, discloses a system and method for encrypting and decrypting a message by a first machine, as the encryption is performed using a derivation key generated by a second machine. The first machine obtains an initialization vector (IV), for example by generating the IV or receiving the IV from another party. The first machine sends the IV to the second machine. The second machine obtains the encryption key and the key derivation function (KDF). The KDF receives the encryption key and the IV as input, and outputs the derived key. Then, the second machine sends the derived key to the first machine. The first machine uses the derived key to encrypt the message.

Each machine may run on a different device, as a device is defined as an electrical device such as a personal computer, laptop, smartphone, server, and the like. In some other cases, the machines run on the same device but are distinct, such as two different virtual machines, or two distinct applications working on a server. The distinct applications are defined as at least one of the following—using different resources, require different credentials to utilize them, each function independently from the other, and the like.

The method and system of the subject matter provides an efficient and secure way of encrypting and decrypting data using a remote device, without having to send the message itself and while preserving the structure of a standard ciphertext. The subject matter discloses a method that achieves the security and performance advantages of the KEK/DEK paradigm, without changing the format or size of the stored ciphertext. In fact, the method presented below actually generates ciphertexts that are indistinguishable from ciphertexts generated by directly encrypting the plaintext with the long-term key.

The term "symmetric-key algorithms" is defined as algorithms for cryptography that use the same cryptographic keys for both the encryption of plaintext and the decryption of ciphertext. The keys may be identical, or there may be a simple transformation to go between the two keys. The keys, in practice, represent a shared secret between two or more parties that can be used to maintain a private information link.

The term "party" as defined below may be a computerized device such as a server, a laptop, a tablet computer, a virtual machine, a smartphone and the like, as long as it has a processor, a memory and the ability to exchange information with the other parties.

The term "key derivation function" (KDF) is defined as a cryptographic hash function that derives one or more secret keys from a secret value such as a main key, a password, or a passphrase using a pseudorandom function. KDFs can be used to stretch keys into longer keys or to obtain keys of a required format, such as converting a group element that is the result of a Diffie—Hellman key exchange into a symmetric key for use with AES. Keyed cryptographic hash functions are popular examples of pseudorandom functions used for key derivation.

FIG. 1 discloses method for encrypting a message using a key derivation function, according to exemplary embodiments of the subject matter.

Step 110 discloses a first machine receiving a request to encrypt a message. The message may be specified in the request, or properties defining the message, such as "address of a business in line #33 of file #4". The message may be included in the request. The message may be sent over the internet, for example as an email message, or a request sent to a server, a request initiated by a user using a mobile application installed on a mobile electronic device such as a smartphone or tablet, and the like. The message may also include an identifier concerning the destination of the encrypted message, defining where the encrypted message should be sent, for example via an IP address, a server, an email address and the like.

Step 120 discloses the first machine receiving or generating an initialization vector (IV). The IV may be sent over a communication channel, or be extracted from a memory address accessible to the first machine. The initialization vector (IV) may be defined as a fixed-size input to a cryptographic primitive that is typically required to be random or pseudorandom, but sometimes suffices to be unique.

Step 130 discloses the first machine sending the initialization vector IV to the second machine. Sending may be performed over a communication network such as the internet, a local access network (LAN), a cellular network, a communication cable such as a coaxial cable, an optical fiber and the like. In some other cases, for example in case both the first machine and the second machine run on a single electronic device, the first machine may send the IV by copying the IV to a memory address in the electronic device and sending the address to the second machine.

Step 140 discloses the second machine computing a derived key using a key derivation function receiving as input the encryption key and the initialization vector. The key derivation function (KDF) may be a stretching function.

Step 150 discloses the second machine sending the derived key to the first machine. Sending may be performed over a communication network such as the internet, a local access network (LAN), a cellular network, a communication cable such as a coaxial cable, an optical fiber and the like. In some other cases, for example in case both the first machine and the second machine run on a single electronic device, the second machine may send the derived key by copying the derived key to a memory address in the electronic device and sending the address to the first machine.

Step 160 discloses the first machine encrypting the message using the derived key and initialization vector. The encryption is defined as converting the message into ciphertext. The encryption is performed by a processor used by the first machine, using memory addresses allocated to the first machine. The derived key may be any form of a derived key selected by a person skilled in the art, that can be used for symmetric encryption.

Step 170 discloses the first machine sending or storing the encrypted message and the initialization vector. The encrypted message may be stored in a predefined memory address of the electronic device on which the first machine runs, or stored in a random address. Sending may be performed as elaborated above, for example in steps 130 and 150.

Figure 2:
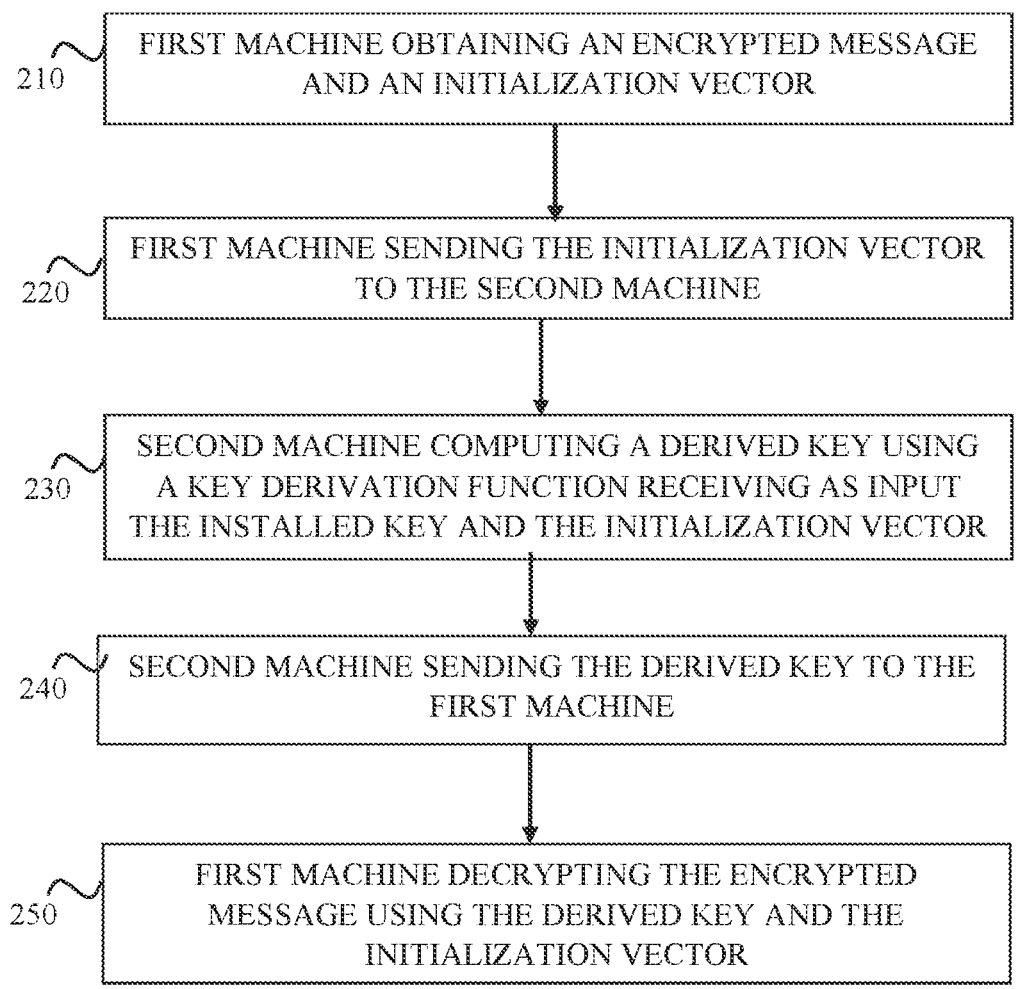
FIG. 2 discloses method for decrypting a message using a key derivation function, according to exemplary embodiments of the subject matter.

FIG. 2 discloses method for decrypting a message using a key derivation function, according to exemplary embodiments of the subject matter.

Step 210 discloses the first machine obtaining an encrypted message and an initialization vector. The encrypted message may be encrypted by another machine or device, and cannot be decrypted by the first machine. The IV is the same IV used to create the derived key used to encrypt the decrypted message stored in a memory accessed by the first machine.

Step 220 discloses the first machine sending the initialization vector IV to the second machine. Said sending may be performed over a communication network such as the internet, a local access network (LAN), a cellular network, a communication cable such as a coaxial cable, an optical fiber and the like. In some other cases, for example in case both the first machine and the second machine run on a single electronic device, the first machine may send the IV by copying the IV to a memory address in the electronic device and sending the address to the second machine.

Step 230 discloses the second machine computing a derived key using a key derivation function receiving as input the encryption key and the initialization vector. The encryption key was stored in the second machine, but not stored in the first machine. Also, the first machine does not have access to the encryption key during the entire process of encrypting nor decrypting the message, only to the derived key.

Step 240 discloses second machine sending the derived key to the first machine. Said sending may be performed over a communication network such as the internet, a local access network (LAN), a cellular network, a communication cable such as a coaxial cable, an optical fiber and the like. In some other cases, for example in case both the first machine and the second machine run on a single electronic device, the second machine may send the derived key by copying the derived key to a memory address in the electronic device and sending the address to the first machine.

Step 250 discloses the first machine decrypting the encrypted message using the derived key and initialization vector.

Figure 3:
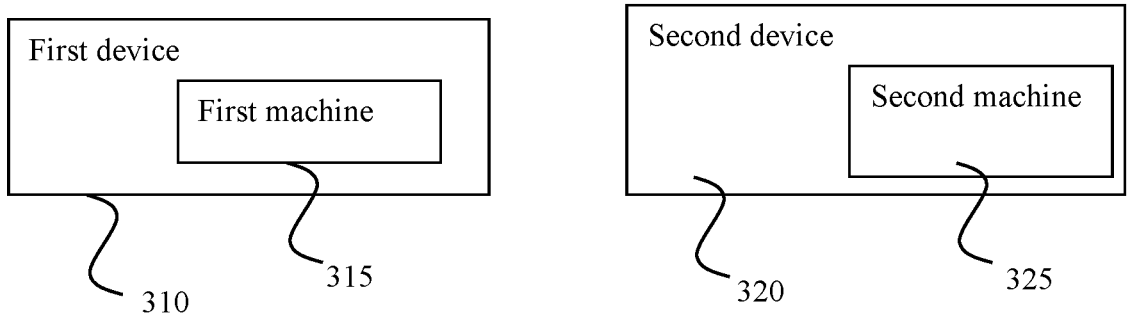
FIG. 3 discloses a system for encrypting a message using two machines running on two devices, according to exemplary embodiments of the subject matter.

FIG. 3 discloses a system for encrypting a using two machines running on two devices, according to exemplary embodiments of the subject matter. The first machine 315 is installed in the first device 310, while the second machine 325 is installed in the second device 320. Each of the devices 310, 320 includes a memory storage, at least a portion of the memory storages is accessed by the machines 315, 325. The memory storages includes the set of rules to execute the processes detailed above. The memory storages are also used to store the message, the encryption key, the initialization vector, the derived key, functions, memory addresses, IP addresses and any additional information required to perform the processes.

Each of the devices 310, 320 includes a processor for performing processes disclosed herein, such as performing key derivation function, encrypting messages, decrypting messages, processing requests to encrypt and decrypt messages, and the like. The processors may be local processors, central processing units, microprocessors and the like.

Each of the devices 310, 320 includes a communication unit used to exchange information with other devices. for example, the communication unit may receive the request to encrypt the message with a third party server, exchange messages with the other device, and the like. The communication unit may be an internet gateway, a modem, interface to a communication cable, and the like.

Figure 4:
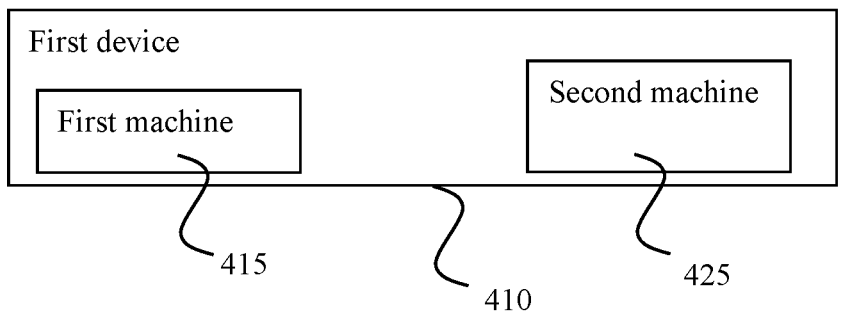
FIG. 4 discloses a system for encrypting a message using two machines running on a single device, according to exemplary embodiments of the subject matter.

FIG. 4 discloses a system for encrypting a using two machines running on a single device, according to exemplary embodiments of the subject matter. Both the first machine 415 and the second machine 425 run on the same device 410. The machines may be distinct from one another based on different areas in the memory of the device 410 accessed to each of the machines 415, 425, different credentials required to access each of the machines, and the like.

While the disclosure has been described with reference to exemplary embodiments, it will be understood by those skilled in the art that various changes may be made, and equivalents may be substituted for elements thereof without departing from the scope of the invention. In addition, many modifications may be made to adapt a particular situation or material to the teachings without departing from the essential scope thereof. Therefore, it is intended that the disclosed subject matter not be limited to the particular embodiment disclosed as the best mode contemplated for carrying out this invention, but only by the claims that follow.

What is claimed is:

1. A system for encrypting and decrypting data without having to send messages and while preserving a structure of a standard ciphertext, comprising a computerized device, comprising:
   a processing system of the computerized device comprising one or more processors; and
   a memory system comprising one or more computer-readable media, wherein the one or more computer-readable media contain instructions that, when executed by the processing system, cause the processing system to perform operations comprising:
   obtaining a message and an initialization vector on a first machine, wherein the initialization vector is a fixed-size input that is random or pseudorandom;
   sending the initialization vector to a second machine via the Internet, wherein the second machine stores an encryption key for a Key Derivation Function (KDF), wherein the second machine generates a derived key by applying the KDF, wherein the KDF receives as input both the encryption key and the initialization vector;
   receiving the derived key at the first machine via the Internet; and
   encrypting the message using the derived key and the initialization vector on the first machine.

2. The system of claim 1, wherein the first machine and the second machine are installed on a single electronic device.

3. The system of claim 1, wherein the second machine is a hardware security module.

4. The system of claim 1, wherein the second machine is a cloud key management system.

5. The system of claim 1, wherein the second machine generates the derived key by performing a multi-party computation (MPC) process with another one or more machines.

6. A method comprising:
obtaining, by a first machine, a message and an initialization vector, wherein the initialization vector is a fixed-size input that is random or pseudorandom;
sending, by the first machine, via the Internet, the initialization vector to a second machine, wherein the second machine generates a derived key on the second machine using a Key Derivation Function (KDF) via a multi-party computation (MPC) process with one or more other machines, wherein the KDF receives as input both an encryption key and the initialization vector;
receiving, by the first machine, via the Internet, the derived key from the second machine; and
encrypting, by the first machine, the message using the derived key and the initialization vector.

7. The method of claim 6, wherein the first machine and the second machine are installed on a single electronic device.

8. The method of claim 6, wherein the first machine lacks access to the encryption key for the KDF.

9. The method of claim 6, wherein the second machine is a hardware security module.

10. The method of claim 6, wherein the second machine is a cloud key management system.

11. The method of claim 6, further comprising:
obtaining, by the first machine, at least one encrypted message and at least one initialization vector, wherein the at least one initialization vector was (i) sent by the first machine to at least one other machine and (ii) used by the at least one other machine to generate at least one derived key in response to the first machine sending the at least one initialization vector;
receiving, by the first machine, the at least one derived key from the at least one other machine; and
decrypting, by the first machine, the at least one encrypted message using the at least one derived key and the at least one initialization vector.

12. A non-transitory, computer readable medium comprising instructions that, when executed by one or more processors, cause operations comprising:
obtaining a message and an initialization vector on a first machine, wherein the initialization vector is a fixed-size input that is random or pseudorandom;
sending the initialization vector to a second machine via the Internet, wherein the second machine stores an encryption key for a Key Derivation Function (KDF), wherein the second machine generates a derived key on the second machine by applying the KDF, wherein the KDF receives as input both the encryption key and the initialization vector;
receiving the derived key at the first machine via the Internet; and
encrypting the message using the derived key and the initialization vector on the first machine.

13. The non-transitory, computer readable medium of claim 12, wherein the first machine and the second machine are installed on a single electronic device.

14. The non-transitory, computer readable medium of claim 12, wherein the first machine lacks access to the encryption key for the KDF.

15. The non-transitory, computer readable medium of claim 12, wherein the second machine is a hardware security module.

16. The non-transitory, computer readable medium of claim 12, wherein the second machine is a cloud key management system, and wherein the second machine generates the derived key by performing a multi-party computation (MPC) process with another one or more machines.

17. The non-transitory, computer readable medium of claim 12, the operations further comprising:
obtaining at least one encrypted message and at least one initialization vector on the first machine, wherein the at least one initialization vector was (i) sent by the first machine to at least one other machine and (ii) used by the at least one other machine to generate at least one derived key in response to the first machine sending the at least one initialization vector;
receiving the at least one derived key at the first machine; and
decrypting the at least one encrypted message using the at least one derived key and the at least one initialization vector on the first machine.

\* \* \* \* \*